United States Patent [19]

Zaromb

[11] 4,198,475
[45] Apr. 15, 1980

[54] METHODS AND APPARATUS FOR GENERATING HEAT AND ELECTRICAL ENERGY FROM ALUMINUM

[75] Inventor: Solomon Zaromb, Newark, N.J.

[73] Assignee: Reynolds Metals Company, Richmond, Va.

[21] Appl. No.: 917,406

[22] Filed: Jun. 20, 1978

Related U.S. Application Data

[63] Continuation-in-part of Ser. No. 843,155, Oct. 17, 1977, Pat. No. 4,150,197.

[51] Int. Cl.² .............................................. H01M 8/08
[52] U.S. Cl. ........................................ 429/15; 429/19; 429/27
[58] Field of Search ............................ 429/23, 12–14, 429/27, 15, 17, 19

[56] References Cited

U.S. PATENT DOCUMENTS

| | | | |
|---|---|---|---|
| 3,172,784 | 3/1965 | Blackmer | 429/13 |
| 3,391,027 | 7/1968 | Porter | 429/13 |
| 3,540,932 | 11/1970 | Zaromb | 429/15 |
| 3,554,810 | 1/1971 | Zaromb | 429/27 X |
| 3,788,899 | 1/1974 | Zaromb | 429/27 X |
| 3,969,144 | 7/1976 | Zaromb | 429/14 |
| 3,981,747 | 9/1976 | Doniat et al. | 429/15 |

Primary Examiner—Anthony Skapars
Attorney, Agent, or Firm—Glenn, Lyne, Girard, Clark and McDonald

[57] ABSTRACT

Heat and electrical energy are generated from aluminum by introduction of aluminum particles on demand into a reaction chamber for reaction with an aqueous electrolyte solution with the concurrent formation of aluminum hydroxide. Improved packing of the aluminum is achieved by exertion of a positive downward pressure on a packed bed of aluminum by a weighted or spring-loaded piston, the pressure providing improved contact between the aluminum particles with resulting improved electrical continuity.

15 Claims, 8 Drawing Figures

Fig. 1
Fig. 2
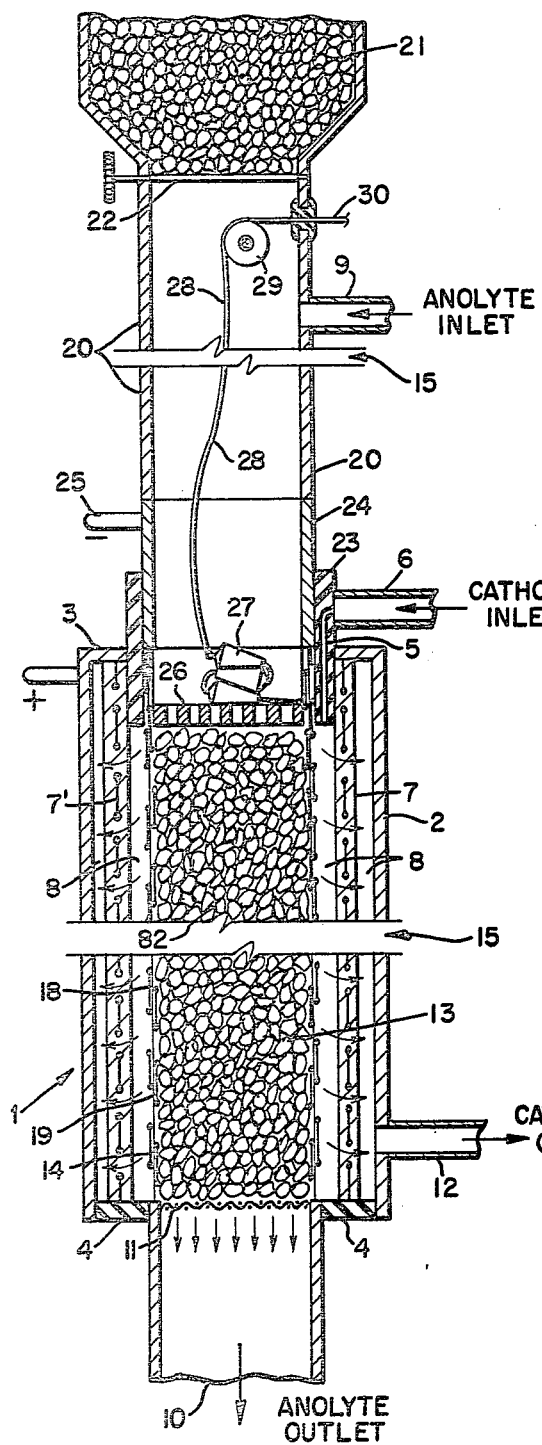
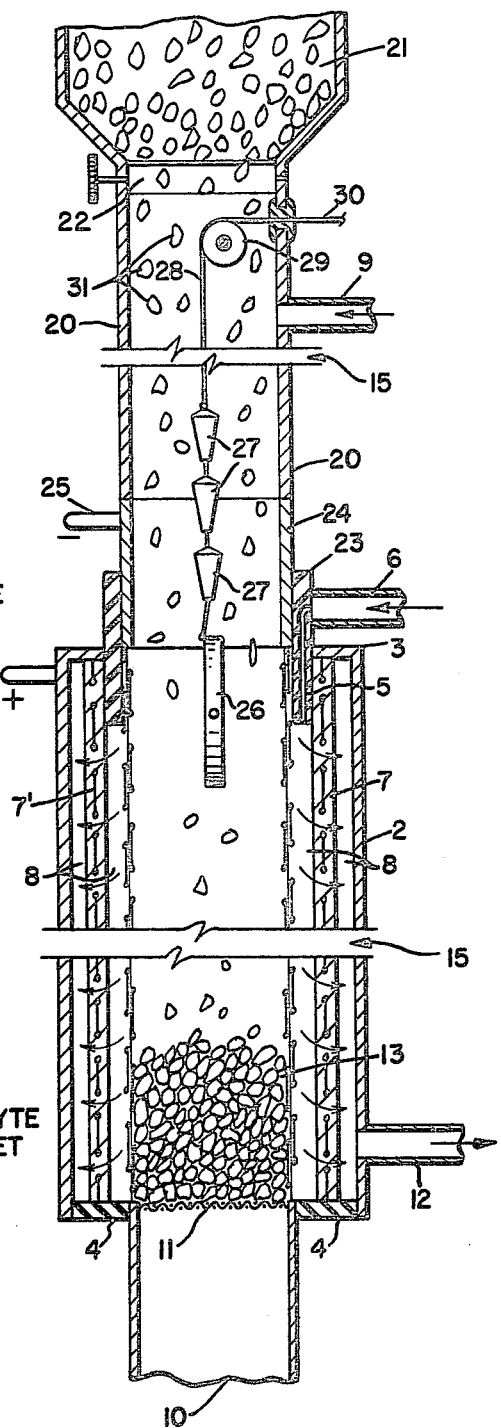

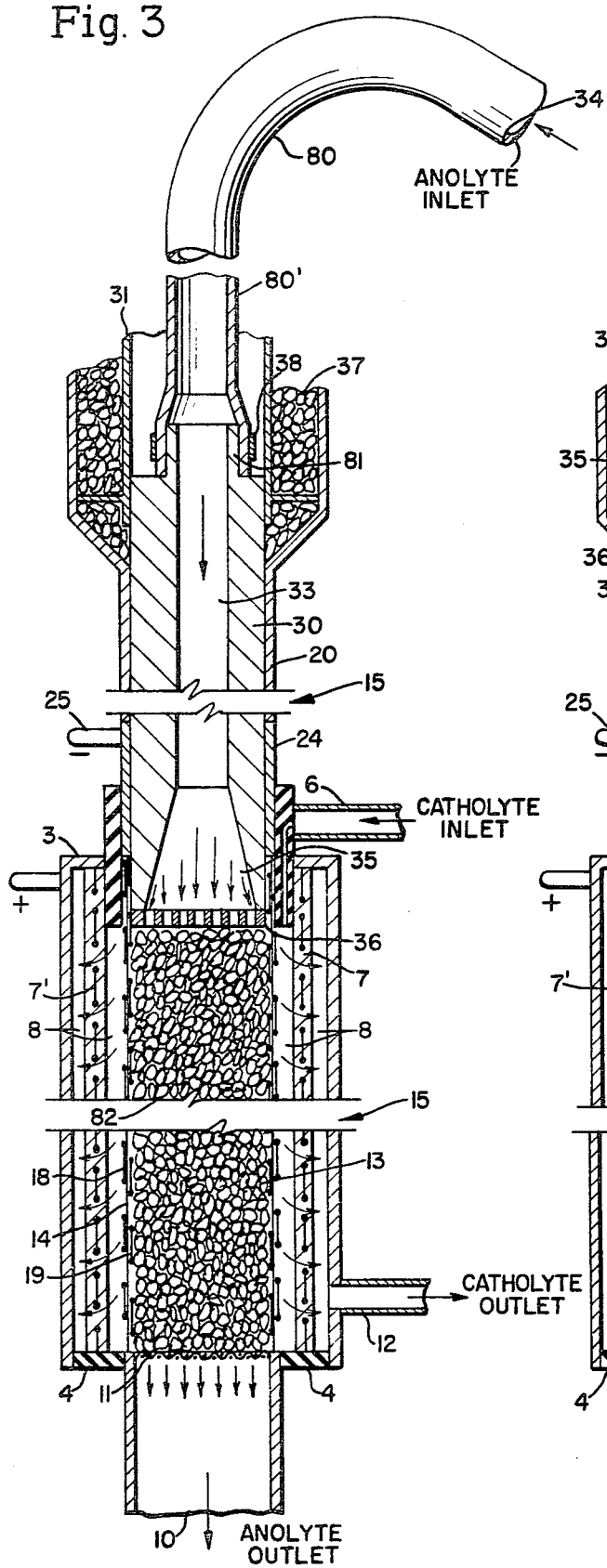

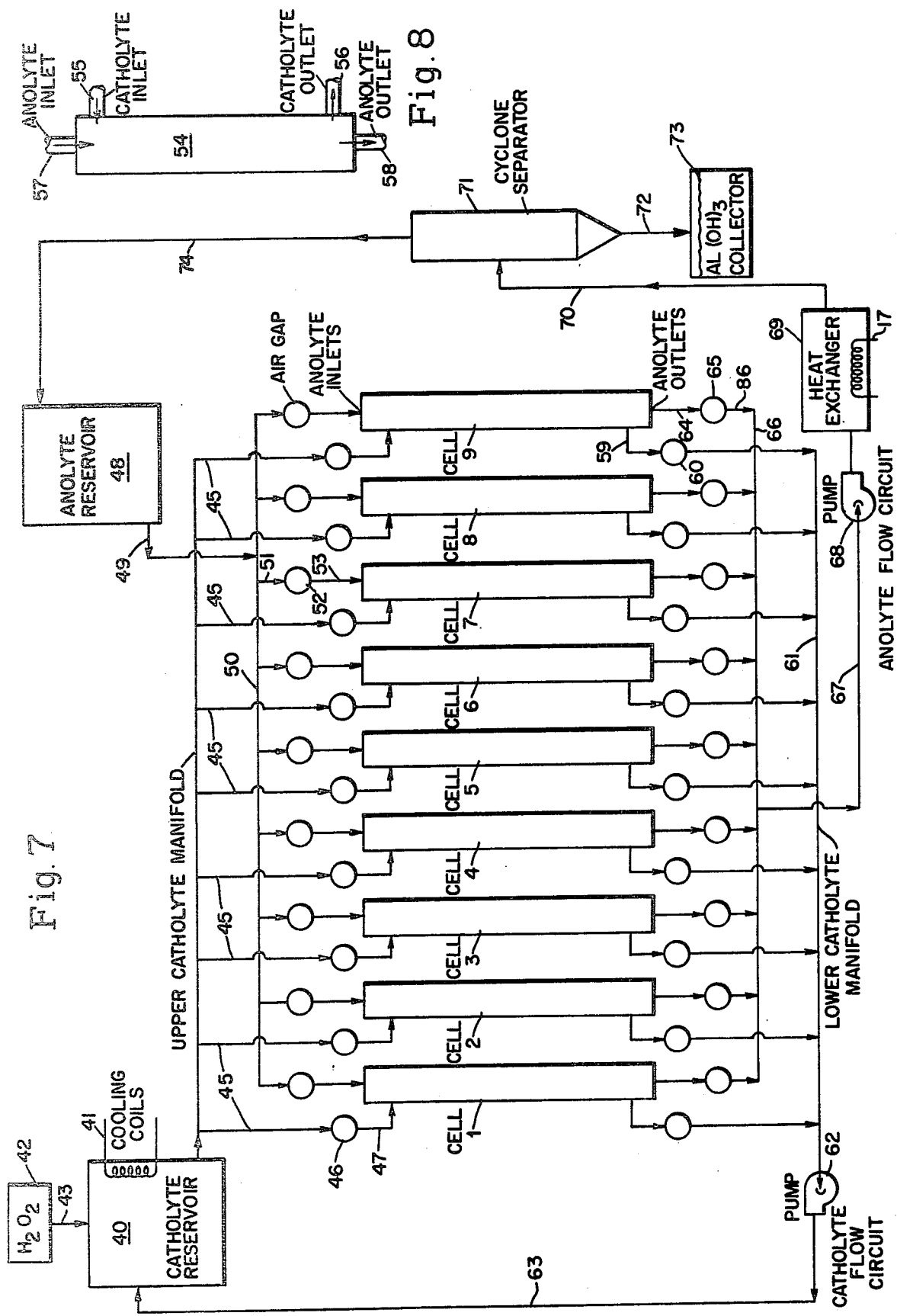

METHODS AND APPARATUS FOR GENERATING HEAT AND ELECTRICAL ENERGY FROM ALUMINUM

CROSS REFERENCE TO RELATED APPLICATIONS

This application is a continuation-in-part of my U.S. application Ser. No. 843,155, filed Oct. 17, 1977, now U.S. Pat. No. 4,150,197.

BACKGROUND OF THE INVENTION

1. Field of the Invention

This invention relates to methods and apparatus for generating heat and electrical energy from aluminum particles or pieces by contact with certain electrolyte solutions, and more particularly, relates to such methods and apparatus where improved contact of the aluminum particles is achieved with improved electrical continuity.

2. Description of the Prior Art

In my above-identified parent application Ser. No. 843,155, there are disclosed methods and apparatus for generating heat and electrical energy from aluminum waste and other inexpensive aluminum products by contact of pieces of such aluminum products with aqueous electrolyte solutions. The aluminum is contacted with an acidic or alkaline aqueous electrolyte solution to produce aluminum hydroxide as a reaction product which reaction serves to generate heat and electricity. The method is carried out by provision of a reaction chamber into which the pieces of aluminum are introduced and reacted with the electrolyte solution. As a result of the reaction, electricity is generated, either directly by having the reaction chamber form part of an electrochemical cell, or indirectly by first generating hydrogen in the reaction chamber and thereafter consuming the hydrogen in a fuel cell. The heat generated in the reaction chamber is carried away by a circulating fluid and may be used for space heating or other applications. The aluminum hydroxide product is removed from the system and may be recycled in production of fresh aluminum. In this system, use is made of a packed bed aluminum anode in which the packing of the aluminum particles is effected only by the combined forces of gravity and pressure exerted by a downward flow of the electrolyte solution. There is, however, no disclosure of use of a positive downward pressure on the packed aluminum to achieve improved contact between the aluminum particles and resultant improved electrical continuity. The present invention provides these aspects and represents an improvement on the invention disclosed in my prior application. The entire disclosure of my prior application Ser. No. 843,155, filed Oct. 17, 1977, is incorporated herein by reference.

Reference is also made to my prior U.S. Pat. Nos. 3,540,932, 3,554,810, 3,788,899 and 3,969,144, all of which are concerned with contact of metals with electrolytes in electrochemical cells. All of these prior patents utilize aluminum sheets or plates and not particles or chunks of aluminum as in the present invention. These patents include the reaction of electrolytes with aluminum metal for the generation of electricity and heat and pertain to the so-called aluminum-air batteries as described, for example, in U.S. Pat. No. 3,554,810.

Subject matter of this type is also discussed in my prior publications, e.g. in "Proceedings, Fourth Intersociety Energy Conversion Engineering Conference," (American Institute of Chemical Engineers, New York, 1969), pages 904–910; "Journal of the Electrochemical Society," Vol. 109, No. 12, December, 1962, page 39; "Journal of the Electrochemical Society," Vol. 109, No. 12, December, 1962, pages 1125–1130; and, "Journal of the Electrochemical Society," Vol. 110, No. 4, April, 1963, pages 267–271.

In my copending application Ser. No. 813,483, filed July 7, 1977, there is disclosed the use of slurry-type aluminum anodes in conjunction with fluidized-bed air cathodes. Such slurry-type anodes should be capable of utilizing aluminum waste products after the latter had been cut up or otherwise comminuted into fine particles or chips suitable for being carried by an electrolyte into properly designed anode compartments. The particles of such a slurry-type anode represent one common form to which the various types of aluminum waste may be reduced in order to be suitable for electrochemical consumption yielding heat and electricity.

In none of these prior patents, applications or publications, however, are there disclosures for use of a packed aluminum anode as in the present invention wherein positive pressure is exerted on aluminum particles for increased efficiency.

SUMMARY OF THE INVENTION

It is accordingly, one object of the present invention to provide a method and apparatus for the consumption of various shapes of aluminum so as to yield heat and electrical energy.

A further object of the present invention is to provide methods and apparatus wherein aluminum is contacted with an electrolyte solution for the production of aluminum hydroxide and the generation of heat and electrical energy.

A still further object of the present invention is to provide a method and apparatus for the generation of electricity and heat, and the production of aluminum hydroxide, by contact of aluminum with an electrolyte solution wherein there is provided a packed bed of aluminum particles as an anode in which positive downward pressure is exerted for improved contact and improved electrical continuity.

It is yet another object of my invention to provide a more efficient and otherwise more practical means of generating electricity for such applications as electric vehicle propulsion, utilizing aluminum waste and other inexpensive aluminum products, such as an electrochemical fuel.

It is still another object of this invention to provide convenient means of feeding aluminum fuel to an aluminum-air cell upon demand, and to provide improved electrical connections between said fuel and the negative cell terminal.

It is a further object of this invention to recover the aluminum hydroxide product generated in the electrochemical consumption of aluminum and thereby effect substantial savings in the energy and mineral resource content of the aluminum products presently lost in refuse.

Yet another object of this invention is to provide a high-power and high-energy-density aluminum power source for submarine applications.

Further objects and advantages of the present invention will become apparent as the description thereof proceeds.

In satisfaction of the foregoing objects and advantages, there is provided by this invention a method for the production of heat and electrical energy by contact of a packed bed of aluminum with an electrolyte solution at moderate temperatures with the formation of aluminum hydroxide as a reaction product, wherein the packed bed of aluminum particles is maintained in packed relationship by exertion of a weighted or spring-loaded piston, with the downward pressure providing improved contact of the aluminum particles and improved electrical continuity.

Also provided by the present invention is an apparatus for generating heat and electrical energy from the consumption of aluminum products which comprises:

(a) a reaction chamber containing a basic or acidic aqueous elecrrolyte solution, the reaction chamber being adapted for introduction of aluminum pieces of various shapes and sizes for effecting a chemical reaction between said aqueous electrolyte and said aluminum pieces to yield thermal and electrical energy and an aluminum hydroxide reaction product;

(b) means for feeding said aluminum pieces into said reaction chamber in small quantities upon demand;

(c) means for removing the heat generated in said chamber as a result of said reaction; and (d) means for maintaining said aluminum pieces in the reaction chamber as a packed bed by exertion of a positive downward pressure thereon.

Also provided are means for removing and recovering the aluminum hydroxide reaction product and means for generating electricity as a by-product.

BRIEF DESCRIPTION OF THE DRAWINGS

Reference is now made to the drawings accompanying this application wherein:

FIG. 1 is one embodiment of an electrochemical cell fully packed with aluminum particles and showing exertion of downward pressure on said packed aluminum;

FIG. 2 is the embodiment of FIG. 1 showing withdrawal of the pressure-exerting means for feeding additional aluminum particles;

FIG. 3 is a second embodiment of the present invention showing an electrochemical cell with a packed bed of aluminum particles with downward pressure exerted by a spring-loaded piston;

FIG. 4 is the embodiment of FIG. 3 showing withdrawal of the spring-loaded piston for feeding of additional particles of aluminum;

FIG. 5 is a detailed view of a porous carbon electrode used in the embodiment of FIGS. 1-4;

FIG. 6 is a detailed view of the grid used in the figures of embodiments 1-4;

FIG. 7 is a complete electrolyte flow circuit showing a series of cells of the type described in FIGS. 1-4 with generation of heat and electricity and recovery of aluminum hydroxide product; and FIG. 8 is a schematic outline of the arrangement of electrolyte flow connections in each of the cells of FIG. 7.

DESCRIPTION OF PREFERRED EMBODIMENTS

As indicated above, this invention is concerned with a reaction chamber wherein pieces of aluminum of various sizes and shapes, up to a maximum predetermined size, may be introduced upon demand and reacted with an aqueous electrolyte solution to generate heat and electricity and form aluminum hydroxide as a reaction product. As pointed out in my prior application, Ser. No. 843,155 referred to above, the aqueous solution may be either strongly acidic or strongly alkaline but alkaline electrolytes are usually preferred. In most cases, the electrolyte is preferably a solution of an alkali metal hydroxide, usually potassium hydroxide, having a concentration in the range of about 2 molar to 10 molar, preferably about 3 to 6 molar.

In this system, the electricity is generated either directly by having the reaction chamber form part of an electrochemical cell, or indirectly by first generating hydrogen in the reaction chamber and thereafter consuming the hydrogen in a fuel cell. The heat generated in the chamber is carried away by a circulating fluid and used for space heating or other applications. The aluminum hydroxide reaction product may be removed from the system and recycled for the production of fresh aluminum. This complete system is described in my prior application referred to above.

In the present invention there are provided methods and apparatus for efficient operation of systems of these types, and in particular, novel and improved methods for introduction of the particles of aluminum into the chamber with means to assure proper packing of the aluminum particles in the bed. According to this invention, a positive downward pressure is exerted on the packed bed of aluminum particles by means of a weighted or spring-loaded piston. The piston may form part of a mechanism assuring proper metering and injection of the particles on demand and may be manipulated in various ways to permit rapid introduction of large amounts of aluminum particles in case of a sudden surge in power demand.

One embodiment of the method and construction of the invention is shown in FIGS. 1 and 2, wherein a reaction chamber containing a packed bed of aluminum particles for reaction with the catholyte solution is shown with the aluminum particles being maintained in packed bed relationship by means of a gravity-weighted piston. The aluminum particles are preferably waste products which are first ground down or cut up by a suitable cutting, grinding or other comminuting device (not shown) into particles sufficiently small to be capable of being carried by an aqueous electrolyte into a narrow packed-bed anode compartment of an electrochemical cell. Apparatus for grinding or cutting up aluminum objects may include a lathe, milling machine, grinder, and/or a guillotine-type device, or a suitable combination of the operating principles of one or more such devices, all of which are well known to persons skilled in the mechanical arts. Alternatively, secondary remolten aluminum or a suitable grade of freshly molten aluminum may be cast directly into elongated pellets of appropriate size and shape by methods well known to persons skilled in the metallurgical art. As may be seen in the drawings, where like reference numerals indicate like parts, an electrochemical cell is provided comprising reaction chamber 1 in cylindrical form and provided with exterior walls 2, a metallic cap 3, and an insulating bottom 4. The chamber comprises a cathode 7 and an anode 82 and is provided with an annular channel 5 through which catholyte solution may flow from the catholyte flow inlet 6. In addition, there is provided a cylindrical hydrogen peroxide-, oxygen- or air-depolarized cathode 7 with annular spaces 8. Anolyte inlet 9 and anolyte outlet 10 are also provided together with a retaining mesh 11 at the bottom of a packed bed of aluminum particles 13. The retaining mesh is constructed of filter cloth, preferably of nickel wire, for improved current collection. The retaining mesh prevents loss of aluminum particles through the bottom of packed bed 13 with the flowing anolyte. Catholyte flow outlet 12 is also provided. The packed bed of aluminum particles 13 serves in conjunction with the retaining mesh 11 and the inner current-collecting grid 19 as the anode 82. A cylindrical separator 14 around bed 13 is provided to prevent direct mixing of the catholyte and the aluminum particles. Reference numeral 15 indicates that the reaction chambers may be of any desired length.

The cathode 7 referred to above may be an air- or oxygen-depolarized cathode of either the conventional type or of the fluidized-bed type disclosed in my co-pending applications Ser. No. 813,483 filed July 7, 1977, and Ser. No. 856,731, filed Dec. 1, 1977, or else a liquid oxidant—especially a hydrogen peroxide-depolarized cathode. The latter is especially useful for submarine applications. It may consist of silverplated nickel screen or foil in contact with a circulating catholyte containing a suitable concentration of hydrogen peroxide (in the range of 0.01 to 2 moles/liter, usually in the range of 0.1 to 0.5 mole/liter), as in certain hydrazine-hydrogen peroxide fuel cells. Alternatively, to improve the utilization of the hydrogen peroxide, the cathode may be preferably of the flowthrough type, as illustrated in FIG. 5, and comprising a porous carbon construction 16 with conductive wire grid 17 therein.

This cathode comprises highly porous carbon impregnated with a controlled amount of a suitable catalyst, such as silver, and in intimate contact with a current-collecting grid. The cathode is impregnated with catalysts only on the hydrogen peroxide entering, or inlet, side. The grid may either be embedded in the carbon, as shown in the drawings, or it may be attached on either surface of the carbon with a suitable electrically conductive binder.

The type of carbon used is any type at which oxygen can be electrochemically reduced but which will not catalyze the decomposition of $H_2O_2$. A suitable type is a high purity grade of activated carbon, possibly on a highly porous graphite base in which the metals content has been minimized by treatment in boiling 6 N HCl. Procedures for producing a carbon of this type are given in W. G. Berl, "Transactions of the Electrochemical Society," Vol. 83, pp. 253–270. (1943), and Yeager et al "Electrochimica Acta," Vol. 9, pp. 1057–1070, (1964).

The catalyst content and distribution within the porous carbon should be such as to yield maximum conversion of $H_2O_2$ to $OH^-$ ions either by direct electroreduction or by partial decomposition of the $H_2O_2$ into water and oxygen followed by electroreduction of the oxygen. Excessive decomposition of the peroxide with concomitant loss of $O_2$ in the form of escaping oxygen bubbles should be preferably prevented. Carbon surfaces free of metallic catalysts are reported to be inactive to $H_2O_2$ while being capable of promoting the electroreduction of oxygen. Silver will catalyze both the electroreduction and the decomposition of $H_2O_2$. Therefore, to achieve maximum conversion efficiency of $H_2O_2$ to hydroxyl ions, the distribution of the metal catalysts within the porous carbon body should be carefully controlled. In particular, most of the silver should be situated near the side where the catholyte enters. Any oxygen formed near that side will then be carried by the catholyte through the porous carbon where it will have the maximum opportunity for electroreduction. Of course, the pores within the carbon cathode should be large enough to permit easy entrainment of the generated oxygen, including any oxygen bubbles, by the flowing catholyte.

As shown in FIG. 6, the separator 14 is supported on both sides by grid portions 18 and 19. This separator is composed of suitable battery separator material, such as asbestos, cellophane, parchment or other cellulosic membrane, an ion-exchange membrane, or other material suitable to prevent direct mixing between the catholyte and anolyte while providing adequate ionic conductance between these solutions. It should also be capable of retaining any small aluminum particles which might pass through the inner grid 19. For good current efficiency, the aluminum particles should be touching each other or a portion of the inner current-collecting grid 19. The latter should be composed of a fine, wide-open mesh woven into or welded at points of contact to a heavier, wide-open mesh so as to pose the least obstruction to electrolytic conduction while assuring adequate structural integrity and electrical contact to the aluminum particles. To minimize contact resistance, the double mesh should be preferably gold-plated.

A feature of the present invention is the provision of means for the addition of more aluminum particles on demand. As may be noted, FIG. 1 shows the reaction chamber containing a full packed bed of aluminum particles with the feeding means closed and FIG. 2 shows a depleted bed with the feeding means operating to add more aluminum particles to the reaction chamber containing packed bed 13 of aluminum.

Thus, the embodiment of FIGS. 1 and 2 is provided with a cylindrical sleeve 20 and further provided with a hopper 21 containing the aluminum particles and hopper release means or valve 22. The cylindrical sleeve provides an inlet 9 for the anolyte solution which passes through the anolyte loop. The top portion of the reaction chamber is provided with an insulator plug 23, conductor 24 and negative terminal 25 for recovering electricity from the anode.

As indicated, the construction shown in FIG. 1 shows a fully packed bed 13 of aluminum particles held in packed relationship by the downward pressure of the flow distributor 26 attached to a series of weights 27. The weights are attached to a cord or wire 28 going over pulley 29 with end 30 leading to a mechanical control. The flow distributor is disk-shaped, thicker or heavier near one of its edges than at the opposite edge, and hinged or otherwise attached to a plurality of similarly shaped weights. The weights should be of nickel or other heavy material substantially inert to the electrolyte. The entire construction should spontaneously assume the "packed position" shown in FIG. 1.

As may be seen in FIG. 1, when the aluminum bed is full or in packed position, the cord or wire 28 is released, whereby the weights and flow distributor are lowered so as to maintain positive pressure on the packed aluminum bed. In FIG. 2, when it is desired or necessary to add additional particles of aluminum to the reaction chamber, the cord or wire is retracted at 30 to withdraw the combination of weights and flow distributor to the position shown. At this point, additional aluminum particles are added from hopper 21 by hopper release means 22 in the manner illustrated in FIG. 2 and aluminum particles 31 are added to the reaction chamber. Thereafter, the cord or wire 28 is released to permit the flow distributor and weights to exert the positive downward pressure on the packed bed of aluminum particles. The construction of FIGS. 1 and 2 is a preferred embodiment in smaller systems, for example, those designed to operate for 10 hours or less between refuelings, and where space is at a premium. For example, a typical design would have a 12" long reaction chamber and a 3" long upper chamber.

In FIGS. 3 and 4, an electrochemical cell, similar to that of FIGS. 1 and 2, is described with the only distinction being in the particular method of maintaining the positive downward pressure on the packed bed of aluminum particles. In this embodiment, like reference numerals indicate like parts to those of FIGS. 1 and 2. In this construction, a piston 30 is disposed within a stationary cylindrical sleeve 31 which permits the piston to slide in and out of the reaction chamber. The interior of the piston is provided with a cylindrical cavity 33 and an inlet 34 for anolyte solution to pass through the packed-bed anode. Inlet 34 may consist of a flexible hose 80, 80' fitting over a nipple 81 protruding from the top of piston 30, and clamped to said nipple by clamp means 38. As may be seen, the cylindrical cavity 33 leads through a coned-shaped forward portion 35 to a flow distributor 36 adapted to exert positive downward pressure against the top of the bed of aluminum particles. The cylindrical sleeve in which the piston slides may contain larger openings at various heights to permit rapid introduction of a large dose of aluminum particles in case of a sudden surge in power demand.

As in FIGS. 1 and 2, a hopper 37 is provided with hopper opening means or valve being integrally connected with the piston. Thus, as may be seen, when the piston is in its lowermost position and is exerting downward pressure on the packed bed of aluminum particles as in FIG. 3, the hopper is closed. As may be seen in FIG. 4, when the piston is withdrawn to a point above the lower portion or mouth 39 or 39' of the hopper, this causes opening of the hopper and permits particles of aluminum 81 to fall by gravity into the reaction chamber of the electrochemical cell. When a sufficient amount of the aluminum particles is added to the reaction chamber, the piston is again lowered which thereby closes the hopper and exerts the positive downward pressure on the packed bed of aluminum particles. The retraction of the piston may be effected by a solenoid and its return to the packed position may be controlled by spring means (not shown) which mechanisms are well known to the art.

The present invention, therefore, provides two separate embodiments for maintaining the positive downward pressure on the packed bed of aluminum particles. However, it is to be understood that alternative means for carrying out the concept of the present invention may become apparent to those skilled in the art after becoming aware of applicant's contribution.

A catholyte flow circuit is shown in FIG. 7 which generally comprises a catholyte reservoir 40 provided with cooling coils 41 and means for the introduction of hydrogen peroxide 42 from line 43. From the catholyte reservoir, catholyte solution is removed to the upper catholyte manifold 44 from which it is introduced into cells 1 to 9 through catholyte inlets by lines 45 via air gaps 46 and line 47. The air gaps mentioned in this system are to prevent stray electrical currents through the electrolyte between the cells. Thus, these air gaps have inner surfaces of each bulb covered with a water repellent material and the inlet slightly below the top of the bulb. Similarly, anolyte reservoir 48 is maintained from which anolyte solution is introduced by line 49 into the upper anolyte manifold 50 and then into cells 1 to 9 through lines 51 to air gaps 52 and anolyte inlets 53. A general inlet-outlet arrangement of cells 1 to 9 is shown in FIG. 8 wherein cell 54 is provided with a catholyte inlet 55, catholyte outlet 56, anolyte inlet 57 and anolyte outlet 58. It will, of course, be understood that this cell, in detailed construction, is an aluminum-oxidant-water reactor of the type shown in FIGS. 1–4 where means is provided for introduction of the aluminum particles into the anode on demand.

At the bottom of each cell, there are provided catholyte outlets 59 wherin the catholyte is removed from the system via air gaps 60 to the lower catholyte manifold 61. The catholyte solution is then recycled by pump 62 to the catholyte reservoir by line 63. Similarly, anolyte outlets 64 are provided at the bottom of each of cells 1–9 for removal of the anolyte solution. The anolyte solution passes through air gaps 65 and lines 86, to the lower anolyte manifold 66. From manifold 66, the anolyte solution in line 67 is pumped by pump 68 through heat exchanger 69 to remove the heat generated in the cells. From the heat exchanger, the solution passes by line 70 into a cyclone separator 71 for removal of aluminum hydroxide precipitate which is removed by line 72 to collector 73. The remaining anolyte solution is then recycled by line 74 to the anolyte reservoir 48.

Operation of the cell and system may be understood with reference to FIGS. 1–4 and 7. As indicated, FIG. 7 shows the nine-cell system wherein each cell generally corresponds to the cells described in FIGS. 1 and 2 or 3 and 4. As may be noted, catholyte reservoir 40, is provided which preferably comprises about 3 molar KOH although this may range from 2 to 10 molar. The KOH preferably contains a small proportion of hydrogen peroxide added as indicated so that the total solution contains about 0.01 to 1.0 molar $H_2O_2$, preferably about 0.1 M $H_2O_2$. The catholyte solution is introduced as described and enters each cell for contact with the grid and porous cathode contained therein. In the meantime, the anolyte solution, which is preferably 2 M to 10 M potassium hydroxide solution, is introduced to each cell for contact with the packed bed of aluminum particles. The anolyte is introduced into the cell so that it contacts the particles of aluminum 13 and current-collecting grid 19, and carries away the heat and the aluminum hydroxide generated in the anode 82. Within the cell, the reaction of the electrolyte solutions, aluminum and water cause the formation of aluminum hydroxide and heat as described above. As the aluminum hydroxide is formed, the packed bed of aluminum particles is accordingly depleted so that it will be necessary to add additional aluminum particles to the packed bed and this is done in the manner described for the embodiments of FIGS. 1 and 2 or 3 and 4.

In the meantime, the heated anolyte solution is removed from the bottom of each cell, cooled, the solid aluminum hydroxide extracted therefrom, and the anolyte recycled to the system. The catholyte solution is similarly recovered and recycled as shown in FIG. 7. The flow rate for the anolyte and catholyte may be varied according to the amount of power generated. The temperature in the system is in the range of 20° to 60° C., preferably about 20° C. The flow rate can be calculated for any given power requirement, noting that it is necessary to remove an amount of heat which is comparable to the rate of power generation.

If it is desired to use a more concentrated electrolyte, e.g. a 6 M KOH solution, there are advantages obtained such as higher current density and the absence or lower amount of precipitate in the cells. However, in order to use these more concentrated systems, and still be able to regenerate the electrolyte, it is necessary to withdraw from the cells portions of the electrolyte nearly saturated with $Al(OH)_3$ and dilute them with water in a separate container, so as to precipitate most of the dissolved $Al(OH)_3$, then separate the precipitate from the electrolyte by means of a cyclone, and finally remove the excess water from the diluted electrolyte by vacuum distillation, as in my copending patent application Ser. No. 704,452, filed July 12, 1976, and return the regenerated KOH solution to the cell.

For instance, if one pound of aluminum is dissolved in three pounds of 6 M KOH, addition of four pounds of water will yield about two pounds of $Al(OH)_3$+six pounds of 3 M KOH. Vacuum evaporation of three pounds of $H_2O$ will then yield about three pounds of 6 M KOH. The distilled water can then be reused in the regeneration of the next portion of nearly saturated 6 M KOH. The heat generated in the Al-air cell is more than sufficient for the vacuum evaporation step.

In an alternative embodiment, hydrogen peroxide can be decomposed outside the fuel cell stack to generate oxygen and water and the oxygen can then be fed into an air cathode either of the conventional type, or the fluidized bed type disclosed in my copending application Ser. No. 813,483, filed July 7, 1977 and Ser. No. 856,731, filed Dec. 1, 1977.

The anolyte circulating through cells 1–9 and through the rest of the flow system of FIG. 7 is an aqueous alkaline solution comprising between 2 and 10 moles/liter of alkali metal hydroxide, preferably 10–30% by weight of potassium hydroxide, and such corrosion-inhibiting additives as sodium or potassium stannate, sodium or potassium gallate, indic hydroxide, thallous hydroxide, and/or mercuric oxide. The latter causes surface amalgamation of the aluminum particles, which in turn improve the electrical contacts between adjacent particles in the packed-bed anode and also between the particles and grid.

Other ways of ensuring good electrical contacts between the particles of the anode is to have the particles preferably in elongated form, e.g. needle-shaped or in form of flat elongated chips or flattened elongated pellets. The surfaces of these particles must, of course, be free of insulating materials. If the particles are obtained from aluminum cans, the latter must first be stripped of any coatings or lacquers baked thereon. The stripping may be effected either chemically by immersion in sulfuric acid for 30 to 60 seconds or in methylethyl ketone for longer periods of time, or else mechanically by sanding, sandblasting, or the like. Furthermore, to remove any oil or grease introduced in the cutting or grinding operation, the aluminum particles should be degreased in trichloroethylene or an equivalent solvent, etched for about 10 seconds in a hot concentrated (approximately 10 molar) NaOH or KOH solution, and rinsed with water before being introduced into the supply hopper. These stripping, etching and rinsing operations may be performed with conventional apparatus.

Once the aluminum particles have been exposed to an electrolyte solution, containing compounds of mercury, gallium, or the like, the protective oxide film on their surface is partly destroyed, and they become subject to oxidation upon exposure to air. Therefore, the aluminum should be introduced into the electrolyte only sparingly upon demand. Any aluminum left within the anode upon cessation of demand for electrical power should be fully used up to charge an auxiliary secondary battery or to provide other useful energy. Alternatively, any residual aluminum in the anode may be protected on shut-down both from corrosion by the aqueous electrolyte and from air-oxidation by displacing the electrolyte with a nonreactive fluid, such as diethyl carbitol.

In order to minimize the amount of aluminum remaining in the cell upon cessation of demand for power, the consumption time of the aluminum particles should preferably be brief. This will occur if the particles are preferably not more than about 0.1 millimeter thick, and are consumed from both sides at a fairly high current density, preferably higher than 0.1 ampere/$cm^2$. At such current densities, any corrosion of the aluminum particles will also be reduced. Furthermore, to prevent corrosion arising from thermal runaway, the electrolyte in the cell must circulate at a sufficient rate and must be cooled sufficiently in the heat exchanger 69 to remove the heat generated in the cells and to maintain the temperature within the cells below a predetermined value, generally in the range of 20°–60° C., preferably about 20° C.

The rates of circulation of the electrolyte and of the cooling fluid 17 (FIG. 7) can be readily controlled by temperature sensors (not shown). Similarly, the polarization of the aluminum particles through current drain can be automatically maintained with a satisfactory range by a voltage-sensing circuit (not shown) designed to retract the weighted or spring-loaded piston and open the hopper when the output voltage of the cell falls below a predetermined range or to connect the cell to charge a secondary battery when the output voltage exceeds the predetermined range. Depending on the operating temperature and on the characteristics of the cathode 7, this output voltage should usually be in the range of 1.4±0.3 volt in well-designed cells.

Although air-depolarized cathodes are preferred for most applications, other types of cathodes, e.g. those depolarized by hydrogen peroxide as described above, or by an oxidizing halogen compound, may also be suitable for special purposes, e.g. for submarines.

The following example is presented to illustrate the invention, but it is not considered as limited thereto. In this example and throughout the specification, parts are by weight unless otherwise indicated.

EXAMPLE

A test cell of the type described held about 3 liters of approximately 3 N KOH, and was divided into two approximately equal compartments with Fiberfrax separators. Two cylindrical porous carbon cathodes impregnated with catalyst, were supplied with oxygen and immersed in one of these compartments. The total apparent area of these cathodes was approximately 325 $cm^2$. The anolyte compartment contained a Hg/HgO reference electrode adjacent to a semi-cylindrical packed-bed anode.

The latter anode was made of a half-inch O.D. Cu tube in which two vertical and two horizontal cuts were made near one end so as to leave two diametrically opposite prongs, 1/16-inch wide×¾-inch long. The ends of these prongs fitted into 1/16-inch-wide notches in a ¼-inch-thick, ½-inch-diameter graphite plug, thereby forming two semi-cylindrical windows. A screen of fine, gold-plated nickel mesh was wrapped around the cylindrical portion of the plug, over the semi-cylindrical window, and over part of the Cu tube. This was affixed to the tube and to the plug by means of two hose-clamps. One of the two resulting screened semicylindrical windows was masked in some experiments with silicone elastomer cement to reduce apparent anode area and thereby permit measurement at apparent anode current densities in excess of 500 mA/cm$^2$.

The packed-bed anode was completed by dropping into the tube about 4 grams of elongated pellets of Alloy MD209, made from Reynolds recycled aluminum, and containing 0.84% Fe, 0.44% Mn, 0.16% Si, 0.15% each of Mg and Cu, 0.11% Zn, and not more than 0.02% each of Cr, Ti, Ni and V. These pellets were nearly cylindrical with their diameters in the range of 0.036±0.01 inch.

The polarization characteristics of the packedbed cathode operating with this material was measured relative to the Hg/HgO reference electrode. After immersion of the anode in the electrolyte, the cell current was adjusted with variable resistance and carefully measured. The cell and reference voltages were measured to the nearest millivolt. The electrolyte was not circulated to any of the components of these experiments.

As a result of these experiments with the packed-bed aluminum anode, an easily achievable apparent current density greater than 500 mA/cm$^2$ was noted at 25°–45° C. with the packed-bed anode of recycled aluminum.

The invention has been described herein with reference to certain preferred embodiments; however, as obvious variations will become apparent to those skilled in the art, the invention is not considered to be limited thereto.

What is claimed is:

1. An apparatus for generating heat and electrical energy from the consumption of aluminum products which comprises:
   (a) a reaction chamber containing an aqueous electrolyte solution, the reaction chamber being adapted for introduction of aluminum pieces of various shapes and sizes for effecting a chemical reaction between said aqueous electrolyte and said aluminum pieces to yield thermal and electrical energy and an aluminum hydroxide reaction product;
   (b) means for feeding said aluminum pieces into said reaction chamber in small quantities upon demand;
   (c) means for removing the heat generated in said chamber as a result of said reaction; and
   (d) means for maintaining said aluminum pieces in the reaction chamber as a packed-bed by exertion of a positive downward pressure thereon.

2. An apparatus according to claim 1 wherein said electrolyte solution is a basic electrolyte solution containing 2 to 10 moles/liter of an alkali metal hydroxide.

3. An apparatus according to claim 1 wherein said downward pressure is exerted by a gravity weighted object.

4. An apparatus according to claim 1 including means for removing and recovering said aluminum hydroxide reaction product and means for generating electricity as a by-product.

5. An apparatus according to claim 3 wherein said gravity weighted object comprises a fluid flow distributor provided with orifices adapted to permit electrolyte solution to flow therethrough, said fluid flow distributor further being serially connected to a plurality of weights designed to exert downward pressure on said fluid flow distributor, said weights being attached to a draw cord adapted to be withdrawn by mechanical means.

6. An apparatus according to claim 3 wherein said object is adapted for automatic withdrawal with introduction of additional pieces of aluminum to replenish the aluminum in said packed bed.

7. An apparatus according to claim 1 wherein said means for exertion of positive downward pressure on said packed bed comprises a spring-loaded piston means.

8. An apparatus according to claim 7 wherein said piston means has an opening therein for introduction of anolyte solution with a flow distributor at the lower end for dispersion of said anolyte solution into the bed of aluminum particles, said piston exerting pressure against the packed-bed.

9. An apparatus according to claim 8 wherein means are provided for automatic withdrawal of said spring-loaded piston to a point where additional particles of aluminum are added to said reaction chamber upon demand.

10. An apparatus according to claim 1 wherein said reaction chamber includes an oxygen or hydrogen peroxide-depolarized cathode.

11. Apparatus according to claim 10 wherein said cathode is a hydrogen peroxide-depolarized flow-through cathode.

12. Apparatus as claimed in claim 11 wherein said cathode comprises a porous carbon layer affixed to a conductive wire grid, catholyte-filled spaces on both sides of said carbon layer through which a catholyte solution enters into and exits from the carbon, and a thin layer of a metal catalyst deposited on said carbon at the catholyte entrance side.

13. Apparatus as claimed in claim 12 wherein said metal catalyst comprises silver.

14. An apparatus according to claim 1 wherein said means for generating electricity comprises a current-collecting grid in which said aluminum pieces are retained so as to form a packed-bed anode forming part of an electrochemical cell.

15. An apparatus according to claim 14 wherein said feeding means is actuated by a voltage-sensing circuit causing said aluminum pieces to be fed to said anode when the voltage of said cell falls below a predetermined range.

* * * * *